(No Model.)

G. H. HELVEY.
TRACTION ENGINE.

No. 265,499. Patented Oct. 3, 1882.

WITNESSES:
John Lorenz
John R. Woods

George H. Helvey INVENTOR
by James W. See
ATTORNEY.

N. PETERS. Photo-Lithographer. Washington, D. C.

United States Patent Office.

GEORGE H. HELVEY, OF HAMILTON, OHIO, ASSIGNOR TO THE HOOVEN, OWENS & RENTSCHLER COMPANY, OF SAME PLACE.

TRACTION-ENGINE.

SPECIFICATION forming part of Letters Patent No. 265,499, dated October 3, 1882.

Application filed August 8, 1882. (No model.)

*To all whom it may concern:*

Be it known that I, GEORGE H. HELVEY, of Hamilton, Butler county, Ohio, have invented certain new and useful Improvements in Traction-Engines, of which the following is a specification.

This invention pertains to traction-engines designed to transmit power to a machine as a thrasher while standing; and it relates to the transmitting devices between the crank-shaft of the engine and the traction-wheels.

Figure 1:
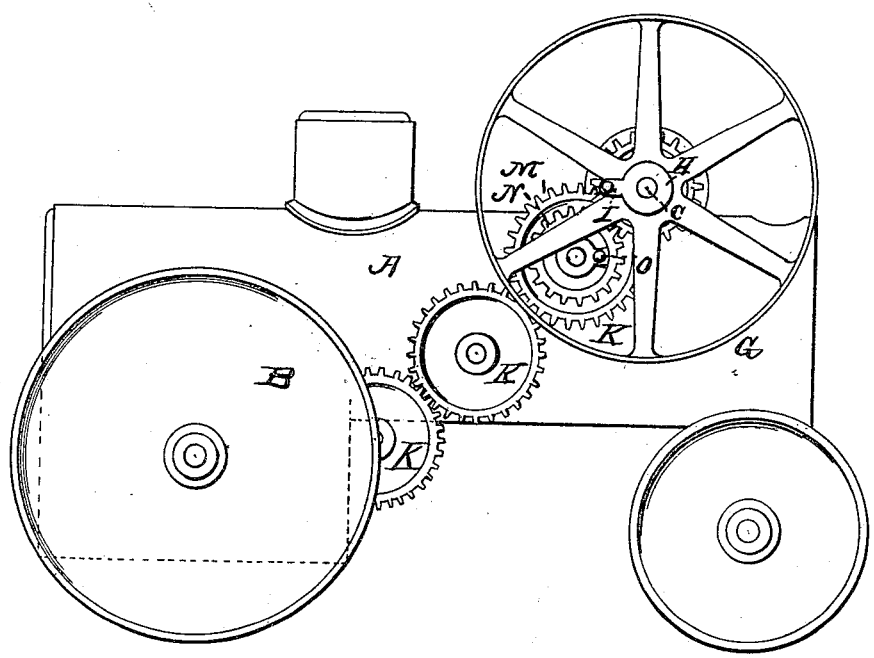
Figure 2:
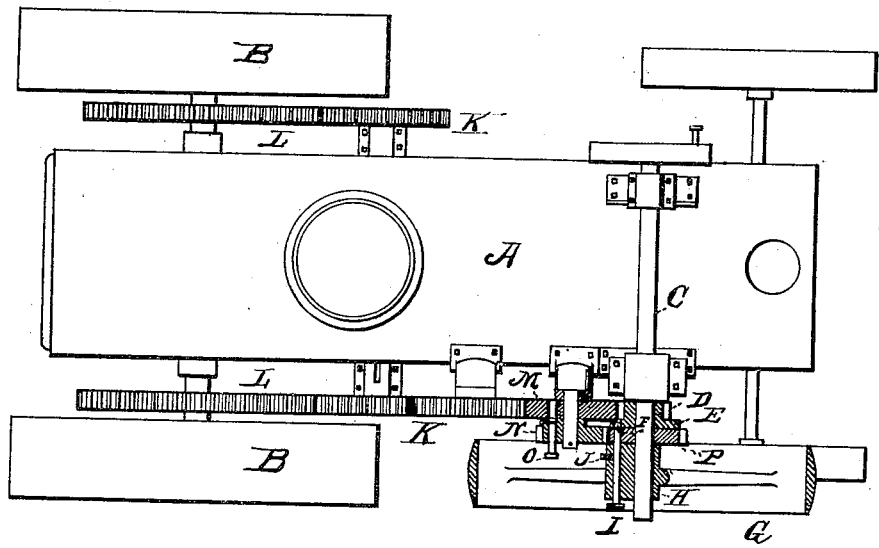

In the accompanying drawings, Figure 1 is a side elevation of the engine, and Fig. 2 a plan with some of the details in section.

The letters denote: A, boiler; B, traction-wheels; C, crank-shaft of engine; D, a pinion loose on the crank-shaft; E, a flange or shroud on this pinion; F, a hole in this flange; G, the fly-wheel; H, the hub of the fly-wheel; I, a pin fitted to slide through this hub parallel with the shaft; J, a set-screw in the hub to hold the pin I where set; K, a train of idle-gears between the crank-shaft C and the traction-wheels; L, gears attached to the traction-wheels; M, a gear forming part of train K and gearing into pinion D; N, a smaller idle-gear alongside the gear M and running independently on the same axis; O, a pin fitted to pass through gear N and into a coincident hole in gear M; P, a larger pinion alongside pinion D, fitted to run loosely and independent of pinion D upon the same shaft. The pinion P is bored to receive the pin I, which may be pushed inward through the pinion P into the hole F in the pinion-flange E. Pushing pin I into engagement with pinion P locks that pinion to the crank-shaft and causes it to revolve with the shaft. Pushing the pin inward still farther till it engages with hole in flange E causes pinions P and D both to revolve with the shaft. If pin O be pushed inward till it engages with gear M, gears M and N will both revolve together. If pin I be drawn out of engagement with pinion P, the gearing will all remain idle while the crank-shaft revolves and transmits motion through a belt on fly-wheel G to a machine, as a thrasher, the engine as a traction-engine remaining stationary. If pin O be pushed clear in to lock wheels M and N together, and pin I be pushed in to engage with pinion P only, the traction-gearing will be revolved at a certain speed relative to the speed of the crank-shaft in an obvious manner, the pinion P being the first driver of the gear system. If the pin O be withdrawn to allow gears M and N to revolve independently, and the pin I be pushed inward to engage with pinion D, the traction-gearing will be revolved at a lesser relative speed than before in an obvious manner, the small pinion D being the first driver of the gear system. By this means the traveling speed of the traction-engine may be reduced at heavy grades while the engine makes the usual number of revolutions and consumes the usual amount of steam. This reduction of speed of travel is equivalent to the application of an increased force to the work to be done.

I claim as my invention—

In a traction-engine, the combination, substantially as set forth, with traction wheels and gearing for transmitting motion from the engine-shaft to the traction-wheels, of two driving-pinions of different diameters loose upon a driving-shaft, a means for locking one or both of said pinions to their shaft, two gears of different diameters fitted to run freely and independently upon a common axis and mesh into the said two pinions, as set forth, and a means for locking said two gears together.

GEORGE H. HELVEY.

Witnesses:
  J. W. SEE,
  ISRAEL WILLIAMS.